(12) United States Patent
Heise et al.

(10) Patent No.: US 8,351,464 B2
(45) Date of Patent: Jan. 8, 2013

(54) RETRANSMISSION IN DATA COMMUNICATION SYSTEMS

(75) Inventors: Bernd Heise, Munich (DE); Michael Horvat, München (DE); Gert Schedelbeck, Munich (DE); Dietmar Schoppmeier, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 21 days.

(21) Appl. No.: 12/209,211

(22) Filed: Sep. 12, 2008

(65) Prior Publication Data

US 2009/0086759 A1 Apr. 2, 2009

Related U.S. Application Data

(60) Provisional application No. 60/976,808, filed on Oct. 2, 2007, provisional application No. 60/984,162, filed on Oct. 31, 2007, provisional application No. 60/991,809, filed on Dec. 3, 2007.

(51) Int. Cl.
*H04J 3/24* (2006.01)
(52) U.S. Cl. .................................................. 370/474
(58) Field of Classification Search .......... 370/464, 370/474, 203, 229–240, 241–253, 254–258, 370/298–306, 361–356, 357–395, 395.1, 370/395.5, 395.21, 395.3, 395.31, 395.32, 370/395.4, 395.41, 395.42, 395.43, 395.52, 370/395.53, 395.54, 395.6, 395.61, 396.411, 370/412–429, 503–520
See application file for complete search history.

(56) References Cited

U.S. PATENT DOCUMENTS

| 5,477,550 | A | 12/1995 | Crisler et al. |
| 5,918,002 | A * | 6/1999 | Klemets et al. ................. 714/18 |
| 6,931,569 | B2 * | 8/2005 | Fong et al. ...................... 714/18 |
| 7,054,316 | B2 * | 5/2006 | Cheng et al. ................. 370/394 |
| 7,554,917 | B1 * | 6/2009 | Tieu ............................. 370/235 |
| 2006/0280238 | A1 * | 12/2006 | Cioffi et al. .................. 375/222 |
| 2008/0062872 | A1 * | 3/2008 | Christiaens et al. .......... 370/231 |
| 2008/0063007 | A1 * | 3/2008 | Christiaens et al. .......... 370/458 |
| 2008/0089314 | A1 * | 4/2008 | Meyer et al. ................. 370/349 |
| 2008/0130659 | A1 * | 6/2008 | Polland .................... 370/395.52 |
| 2009/0138775 | A1 * | 5/2009 | Christiaens et al. .......... 714/748 |

FOREIGN PATENT DOCUMENTS

CN 1113402 A 12/1995

(Continued)

OTHER PUBLICATIONS

Tony Jeffree and Bob Grow, Request for New Slow Protocol Subtype for ITU-T Developed Protocols, International Telecommunication Union, COM 15—LS 158—E, Telecommunication Standardization Sector, Study Period 2005-2008, Source: ITU-T SG15, Geneva Jun. 4-15, 2001.

(Continued)

*Primary Examiner* — Kwang B Yao
*Assistant Examiner* — Jung-Jen Liu
(74) *Attorney, Agent, or Firm* — Infineon Techn. AG Patent Department

(57) ABSTRACT

In one implementation, a transmission apparatus includes a protocol stack for a DSL transmission system, the protocol stack includes a retransmission functionality, the retransmission functionality being provided between a sublayer of a TPS-TC layer and a data link layer, the retransmission functionality having a fragment of a packet or a group of fragments of a packet as basic retransmission unit. The protocol stack may implement a service specific retransmission functionality such that for a first class of services retransmission protection is provided and for a second class of services no retransmission protection is implemented.

22 Claims, 12 Drawing Sheets

FOREIGN PATENT DOCUMENTS

| | | |
|---|---|---|
| EP | 1901494 A1 | 3/2008 |
| WO | 95/04421 A1 | 2/1995 |
| WO | 2006118439 A1 | 11/2006 |

OTHER PUBLICATIONS

Trend's First Mile, Pocket Guide, Trend Communications Ltd., Maidenhead, www.trendcomms.com.

Introduction of multi-frequency operation for 1.28 Mcps TDD, 3GPP TS 25.321 v7.5.0, Jun. 2007, Change Request 3GPP TSG-RAN2 Meeting #59, Athens, Greece, Aug. 20-24, 2007, pp. 1-16.

3 GPP TS 25.309 V6.0.0 (Sep. 2004), Technical Specification Group Radio Access Network; FDD Enhanced Uplink; Overal description Stage 2 (Release 6), pp. 1-23.

* cited by examiner

*Fig. 6a*  Standardized PAF Fragment
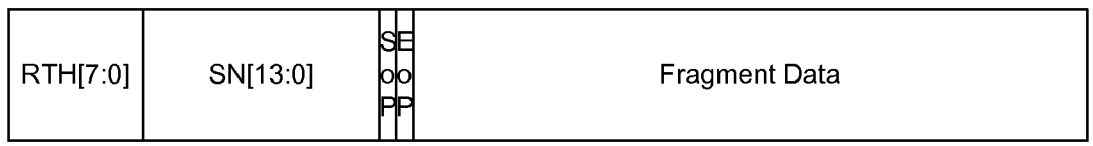
Standardized PAF Fragment with additional Retransmission Header RTH
*Fig. 6b*
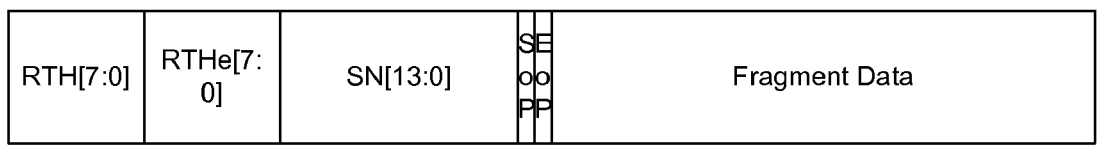
*Fig. 6c*  Data Units with a Retransmission Request

RETRANSMISSION IN DATA COMMUNICATION SYSTEMS

REFERENCE TO RELATED APPLICATIONS

This application claims the benefit of the priority date of U.S. provisional application 60/976,808 filed on Oct. 2, 2007, U.S. provisional application 60/984,162 filed on Oct. 31, 2007 and U.S. provisional 60/991,809 filed on Dec. 3, 2007, the contents of which are herein incorporated by reference.

BACKGROUND

Modern data communication systems such as DSL communication systems transmit a plurality of different data types. Data of high-quality services such as IPTV services or video services require an efficient noise protection since missing data often provide strong disturbances of these services. Present impulse noise protection with Reed Solomon coding and interleaving provide not sufficient protection for these high-quality services.

Retransmission schemes have been introduced to address noise protection for high-quality services. In retransmission, data transmitted over a communication link such as a subscriber line is stored at the transmitter site for some time. In case the receiver site receives corrupt data, for example when an impulse noise occurs, the transmitter site retransmits the data based on a request from the receiver to again over the communication link.

BRIEF DESCRIPTION OF THE SEVERAL VIEWS OF THE DRAWINGS

FIGS. 6a to 6c show examples of fragment headers; and

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

In the various figures, identical or similar entities, modules, devices etc. may have assigned the same reference number.

In the following various embodiments of a retransmission system are described. The embodiments are described with respect to a DSL system such as an ADSL or VDSL system. However, it is to be understood that the various embodiments may also be implemented in other data communication systems for providing retransmission.

Figure 1:
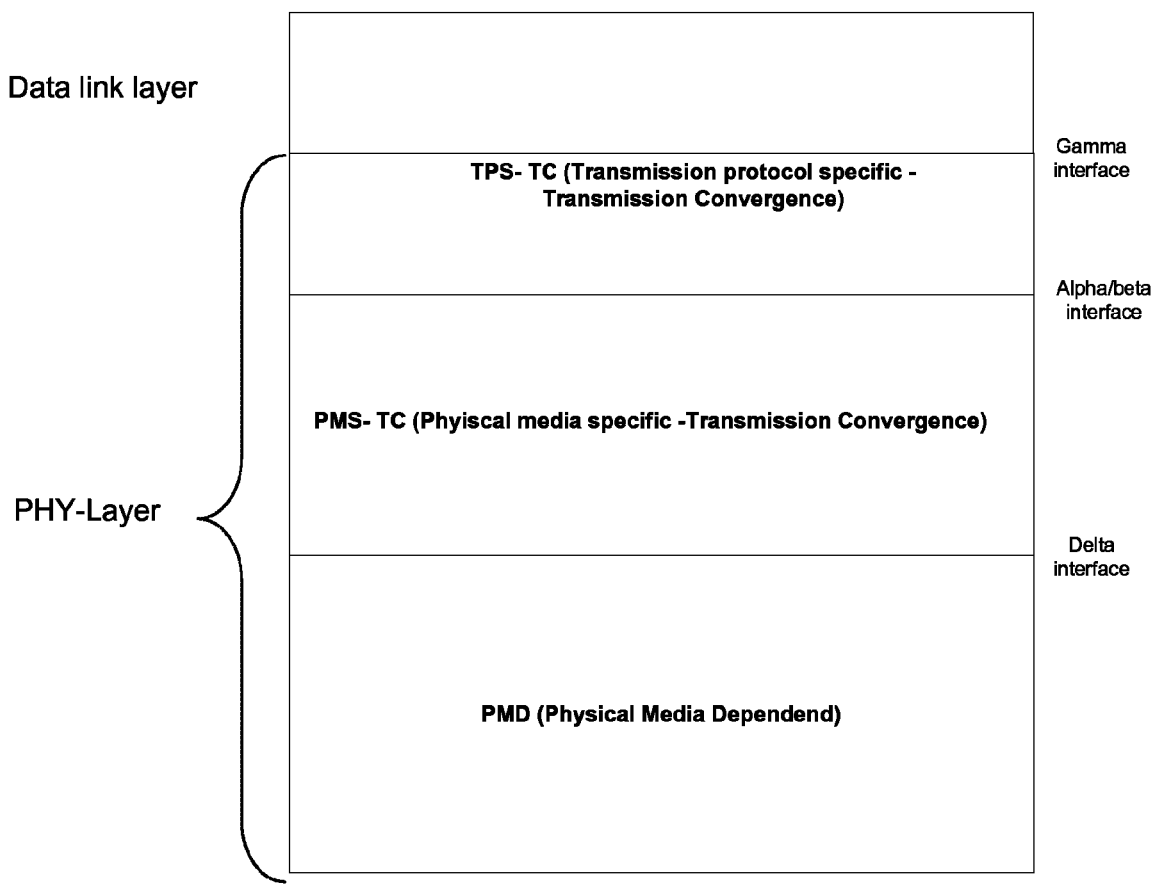
FIG. 1 shows a schematic block diagram of a communication layer model.

For better understanding, in the following an exemplary protocol stack of a present VDSL or ADSL system is explained with respect to FIG. 1. FIG. 1 shows the lowest two layers in the OSI model, i.e. the PHY and the data link layer. According to FIG. 1, the PHY layer (first layer in the OSI model) is divided into three layers or PHY-sublayers. The first layer is the PMD (physical media dependent) layer including basic functionality such as symbol timing generation and recovery, encoding and decoding, modulation and demodulation, echo cancellation (if implemented) and line equalization, link startup, and physical layer overhead (superframing). Additionally, the PMD layer may generate or receive control messages via an overhead channel.

The next PHY-sublayer is the PMS-TC (physical media specific-transmission convergence) layer which is connected to the PMD layer through the δ interface. The PMS-TC layer is a management plane and provides management primitive indications to management entities in the CO and CPE modems. The PMS-TC layer provides in addition functionality such as generation of frames and synchronization of frames, (de)scrambling, Reed-Solomon coding and interleaving. The third PHY-sublayer is the TPS-TC (transmission protocol specific-transmission convergence) layer which is connected to the PMS-TC layer through a α-interface (alpha-interface) at the Central Office Site or a β-interface (beta-interface) at the subscriber site. The TPS-TC layer provides functionality such as packetizing into frames, organizing of the bearer channels, multiplexing. The TPS-TC layer is connected to the data link layer (layer 2 in the OSI model) by the γ-interface (gamma-interface).

While the above described existing DSL layer model does not provide a retransmission functionality or retransmission layer, embodiments of the present invention address the provision of a retransmission functionality or retransmission layer for a DSL transmission system. According to one aspect, a retransmission functionality is provided for a DSL transmission system by providing a retransmission sublayer (which may sometimes be referred to as retransmission layer) above at least one sublayer of the TPS-TC layer. According to embodiments, the retransmission sublayer may be located above the 64/65-octet encapsulation sublayer of the TPS-TC layer and below the data link layer. Furthermore, according to embodiments, the retransmission sublayer may be provided at the gamma interface and below the data link layer. According to one embodiment, the retransmission sublayer may be provided between the 64/64-octet encapsulation sublayer and a bonding sublayer.

In embodiments, the basic retransmission unit is a fragment of a packet. In other embodiments, the basic retransmission unit is a group of fragments of a packet. Therefore, in embodiments, a fragment of a packet or a group of fragments of a packet are stored in a retransmission buffer to allow retransmission of a fragment or a group of fragment.

Retransmission at the gamma interface or above at least one sublayer of the TPS-TC layer allows according to one embodiment to make reuse of existing bonding sublayer functionality in case of bonding and non-bonding applications, i.e. reuse of PAF (Packet Aggregation Function) for the 64/65-octet TPS-TC sublayer.

Furthermore, retransmission schemes at the gamma interface or above at least one sublayer such as the 64/65 octet encapsulation layer avoids problems occurring in implementations of retransmission schemes below the gamma interface. For example retransmission in the PMS-TC layer or below is based on a continuous data stream since TPS-TC sublayer applies rate decoupling. If data is missing from the upper sublayer, idle bytes are inserted in case of 64/65-octet TPS-TC sublayer. This means that retransmission will be done also for idle data carrying no information. In case of retransmission above sublayers of the TPS-TC layers or at the gamma interface the useless retransmission of rate decoupling data can be avoided.

Furthermore, retransmission schemes in the PMS-TC layer or at the alpha interface may have a negative effect on the bonding sublayer since retransmission of one line in the bonding group increases the differential delay for the bonding sublayer. Line specific retransmissions lead to a differential delay variation for the bonding sublayer and it is not known by the bonding sublayer when it has to tolerate which differential delay due to retransmission. If the retransmission sublayer is placed at the gamma interface bonding & retransmission sublayer can in an embodiment be combined so that this problem can be overcome.

Retransmission at gamma interface can realize service specific retransmission also with one latency path or bearer channel. The service specific retransmission has the advantage that a retransmission overhead (e.g. sequence numbering) has to be taken into account only for the service which may be protected but not for other services which are not protected by retransmission for example low priority services. Since no additional overhead is required for the services which are not protected these services do not take away line bandwidth for retransmission. Additionally, the bandwidth of a non-retransmission service with variable bit rate (e.g. data service) may be used during retransmission. This may reduce or even obsolete the need to foresee an overhead in the bandwidth of the retransmission service.

A retransmission scheme at the gamma interface can be implemented in a PHY connected network processor which gives the advantage that usually the buffer or memory limits are more relaxed than for a PHY memory. Additionally the network processor can provide advantages for a service specific retransmission scheme since service classification is also done there.

Furthermore, according to one aspect of embodiments, existing bonding sublayer functionality is reused also for the retransmission sublayer. For example, embodiments of the pre-sent invention implement a 64/65-octet TC sublayer with a fragmentation function, sequence numbering function of the bonding sublayer called PAF (PMA Aggregation Function=Physical Medium Attachment Aggregation Function) and OAM (Operation Administration and Maintenance) insertion & extraction function of the bonding sublayer called BACP (Bonding Aggregation Control Protocol). These functions are provided for providing bonding functionality but can be reused for providing retransmission functionality as will be described in more detail below. PAF functionalities are for example described in IEEE 802.3ah-2004 and BACP functionalities are described for example in the Draft Amendment 2 to ITU Recommendation G.998.2, June 2007.

Each fragment or a group of fragments may contain retransmission specific information such as first information indicating whether the fragment or the group of fragments contains retransmitted data or does not contain retransmitted data. The retransmission specific information may be provided in an additional header field appended to the existing header. The additional header field may be of the size of one byte. Furthermore, each fragment or each group of fragments may contain second information related to retransmission indication, for example information indicating how many times the retransmitted data has been transmitted prior to the current retransmission. For example, the retransmission indication may indicate that the retransmission data are retransmitted for the first time, the second time or a nth time. Furthermore, information related to the different categories of the data streams (priority or class of service) may be provided in the additional header field.

According to embodiments, the retransmission is based on a sequence number information of the last correctly received fragment.

The sequence number information may be included in a retransmission request generated and transmitted to the transmitter when the receiver detects a corrupt received fragment, for example due to the start of a noise impulse. The retransmission request may be repeated as long as no retransmission data has been received by the receiver.

Furthermore, in the direction from the subscriber to the CO (Central Office), a retransmission request channel may be provided by using the additional header field described above. Rate decoupling may be provided for the request channel.

According to embodiments, the retransmission sublayer is separated from the bonding sublayer and provided between the bonding sublayer and 64/65-encapsulation in the TPS-TC sublayer. A rate decoupling functionality may be provided in the retransmission sublayer such that idle fragments of a new category (which are hereinafter referred to as special idle fragments) are inserted and removed in the retransmission sublayer. The special idle fragments are however not identified as idle fragments by the TPS-TC layer. Therefore, the special idle fragments are transparent to the TPS-TC layer and are not removed at the TPS-TC of the receiver site but are transferred to the retransmission sublayer where the information contained in the special idle fragments can be analysed for gaining retransmission information such as a sequence number information of the fragment. The special idle fragments are then removed at the retransmission sublayer.

A sequence number scheme is provided for identifying the fragments containing user data (user data fragments) as well as the special idle fragments. The sequence number scheme reuses the sequence number functionality provided by the bonding sublayer for the user data fragments together with a sequence number functionality provided at the retransmission sublayer.

According to one embodiment, the special idle fragments are used for training or determining one or more repetitive noise parameters such as REIN (repetitive electrical impulse noise) parameters. The one or more repetitive noise parameters may then be used to determine time periods during which repetitive noise is expected. During the determined time periods of repetitive noise, no user data may be transmitted. According to one embodiment, instead of user data the special idle fragments are transmitted during the determined time periods.

To determine the repetitive noise parameters, a plurality of special idle fragments is repeatedly transmitted from the transmitter to the receiver, wherein each of the special idle fragments comprises a sequence number. One or more sequence numbers of corrupted special idle fragments are identified at the receiver and one or more repetitive noise parameters based on the identified sequence numbers are determined. According to one embodiment, information related to a start and end of a repetitive impulse is transmitted from the receiver to the transmitter and the repetitive noise parameters are determined based on the transmitted information.

The repetitive noise parameters determined may be periodicity and length of the repetitive noise. The above determining of repetitive noise parameters may be performed once after link start-up or may be repeatedly performed during showtime.

Figure 2:
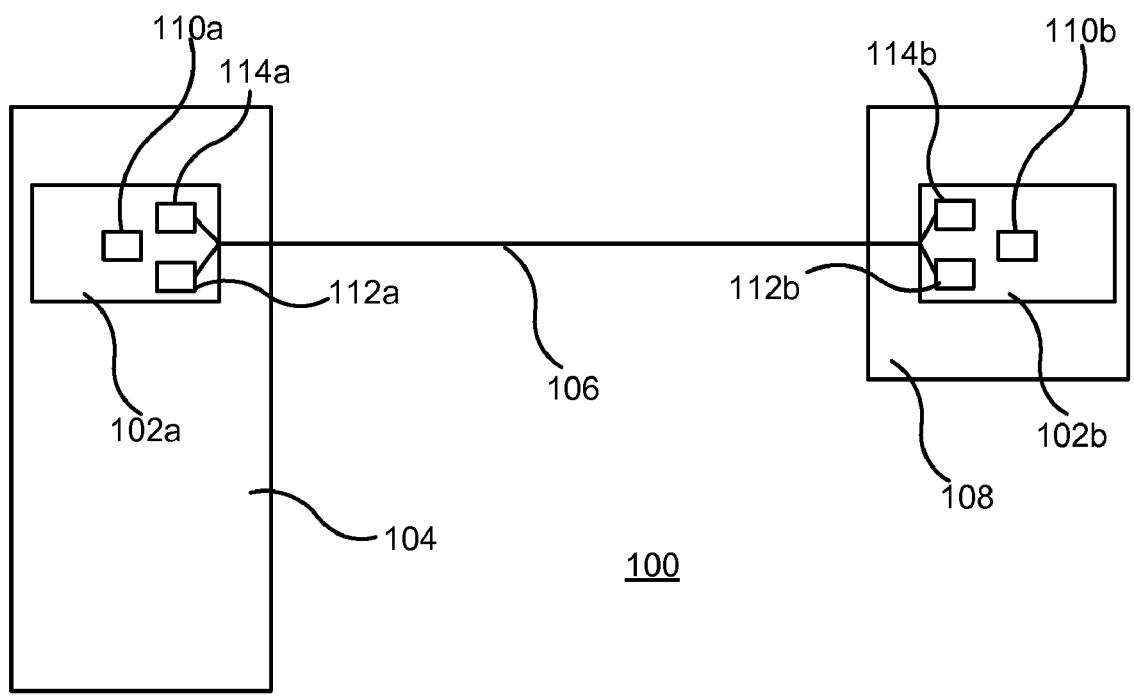
FIG. 2 shows a schematic diagram according to an embodiment of the present invention.

Referring now to FIG. 2, an exemplary DSL communication system 100 is shown. As is known to a person skilled in the art, the DSL system 100 may be a DMT (discrete multitone) system wherein data are modulated on plurality of subcarriers such that each subcarrier is associated with one carrier frequency. The DSL system comprises a first transceiver unit 102a provided at the operators site in an unit 104 such as a central office, a cabinet or other optical network termination units. The first transceiver unit 102a is coupled to a second transceiver unit 102b via a subscriber line 106. The second transceiver unit 102b is integrated in a unit 108 at the subscriber site for example a costumer premise equipment (CPE) such as a modem, router or any other gateway which may also be integrated in other devices such as a personal computer or notebook.

The first transceiver unit 102a includes a first transmitter 112a and a first receiver 114a coupled to the sub-scriber line 106. The second transceiver unit 102b includes a second transmitter 112b and a second receiver 114b coupled to the subscriber line 106. For coupling of the transmitters and receivers each of the transceiver units may comprise a coupling interface such as hybrid networks etc.

A first controller 110a may be provided to provide controlling and coordination functions for transceiver unit 102a. Furthermore, a second controller 10b may be provided at the subscriber site to provide controlling and coordination functions for transceiver unit 102a.

While FIG. 2 shows the controllers 110a and 110b integrated with a respective one of transceiver units 102a and 102b, it is to be understood that the controllers 110a and 110b may be provided separate from the respective transceiver unit. It is further to be understood that components and entities shown may be implemented in hardware, software, firmware or any combinations thereof.

Furthermore, while FIG. 2 shows only one subscriber line to a remote subscriber, it is to be understood that more than one transceiver unit 102a may be implemented in unit 104. Furthermore, as will be described in more detail below, two or more subscriber lines may be bonded to provide higher data rate to a subscriber.

Figure 3:
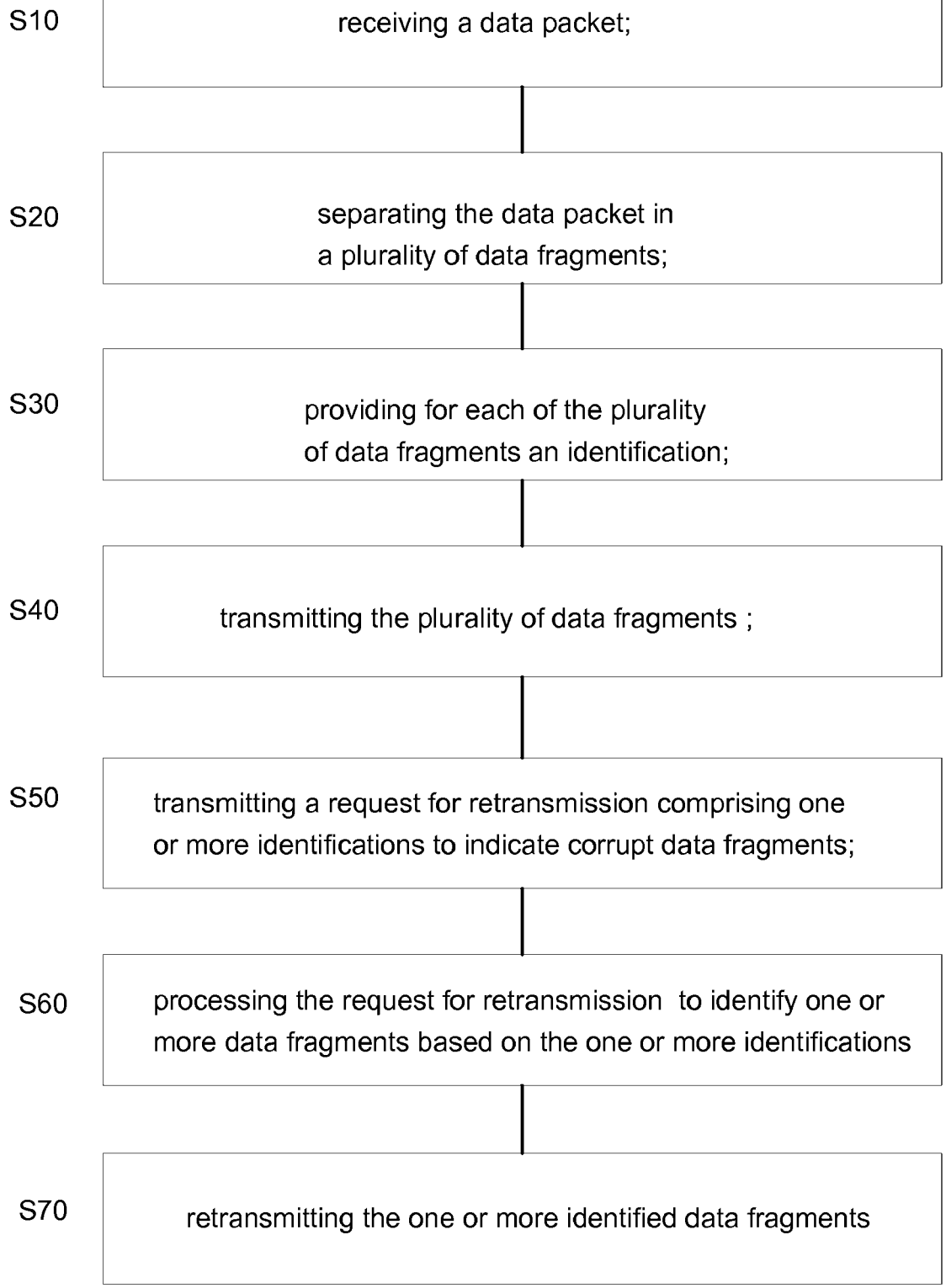
FIG. 3 shows a chart diagram according to an embodiment of the present invention.

Referring now to FIG. 3, an exemplary operation for providing retransmission is shown.

In a step S10 a data packet such as an Ethernet packet is received at the first transceiver unit 102a, for example from a backbone network. The data packet is separated in a plurality of data fragments at S20. For each of the plurality of data fragments an identification is provided at S30. Then, at S40 the plurality of data fragments are transmitted from the first transceiver unit 102a to the second transceiver unit 102b. At S50, a request for retransmission comprising one or more identifications to indicate corrupt data fragments is transmitted from the second transceiver unit 102b to the first transceiver unit 102a. The request for retransmission at the first transceiver unit is processed at S60 to identify one or more data fragments based on the one or more identifications. Finally, at S70 the one or more identified data fragments are retransmitted.

It is to be noted that the data packet received at the first transceiver unit can be a data packet of variable length such as an Ethernet packet. According to embodiments, each data fragment may be processed between S30 and S40 to provide 64/65 octet encapsulation. The separating of the data packet (S20) and the providing of identification for each data packet (S30) may be implemented by processing the data packet between a 64/65 octet encapsulation sublayer and a data link layer as will be described in more detail below.

Furthermore, according to embodiments, distributing of the data fragments to a plurality of subscriber lines based on the data fragment identification may be provided for implementing bonding functionalities. It is to be noted that a synergetic effect may be provided here by the use of the data fragment identification for identifying the fragments in bonding as well as in retransmission. Furthermore, other functionalities may be shared between bonding and retransmission entities. The data fragment length may be variable and may for example be determined during initialisation or dynamically during normal operation. The data fragment length may have in an embodiment a minimum size of for example 32 bytes, 64 bytes, 128 bytes, 256 bytes, 512 bytes etc. In other embodiments other minimum fragment sizes may be implemented.

According to embodiments, a service specific retransmission may be provided by multiplexing a first data stream associated with a first service type, a second data stream associated with a second service type and a third data stream associated with retransmission data. Embodiments related to the service specific retransmission will be described in more detail below.

Furthermore, a packet start identifier may be provided in one of the data fragments. Similar, a packet end identifier may be provided in one of the data fragments. The packet start and packet end identification can be used to provide error detection for example by using CRC (cyclic redundancy check) methods such as CRC 16.

In the following, specific features of retransmission embodiments related to the retransmission data unit, error detection, the retransmission request channel, service specific retransmission and the classification of the retransmission within the layer model are described. It is to be noted that the features described below may be combined in various ways in order to implement various embodiments.

Retransmission Data Unit

If a bonding sublayer PAF is implemented in the DSL system, a fragmentation function is already provided with a configurable fragment size to construct fragments for distribution on links of a bonding group. Such fragments can be seen also as basic retransmission data units. So in case of retransmission and non-bonded links, the PAF fragmentation can be reused for building retransmission data units and in case of retransmission with bonded links, the PAF fragmentation builds fragments which are also retransmission data units.

According to embodiments, the fragment size configuration may be extended in such a way that it is not static any longer and to adapt the size dynamically dependent on the current noise scenarios if impulse noise measuring is done at the far-end and if this information is transferred to the retransmission & bonding sublayer transmitter.

It is to be noted that also the static fragment configuration size range which is in existing systems between 64 and 512 bytes could be extended for the need of retransmission.

FIG. 6a shows a conventional fragment with a PAF header of 16 bits including SOP (start of packet) and EOP (end of packet) bits as well as the sequence number bits SN (14 bits) provided by the PAF fragmentation of the bonding sublayer. FIG. 6b shows the modification of the fragment according to one embodiment. A RTH field (retransmission header field) is prepended containing one additional byte (8 bits). The RTH field may be used for providing retransmission specific information such as for indicating whether the data in the fragment data field is retransmitted data, to indicated how many times the data has been retransmitted (retransmission data repetition indication), the marking of different data streams according to the different categories (priority) and indication of retransmission sublayer specific data such as whether the fragment is a special idle fragment or not.

Error Detection

The bonding sublayer PAF offers the functionality of fragmentation with a fragment header consisting of sequence numbering via 14-bit SID and packet boundary indication via the two bits StartOfPacket, EndOfPacket and fragment CRC-16 protection is supported by TPS-TC. This is needed for reordering and reassembly. This functionality can be reused for error detection and generation of retransmission requests. It is to be noted that the above functionalities are for example described in FIG. 61-10 of IEEE 802.3 standard.

In case of non-bonded links and if the link is error-free, the receiver sees for a current received fragment that this identification SID is the identification SID+1 of the last received fragment.

If a noise impulse or other noise occurs, the receiver can detect after the end of noise impulse that SIDs are missing since then SIDcurrent is not equal SIDlast+1.

In other embodiments, the receiver can detect the noise situation from the FEC (forward error correction) evaluation immediately and start a retransmission request immediately for all fragments that are expected during the time of disturbance. Here the receiver can notify the transmitter about the situation by indicating which packet was the last correctly received and how long the stream of bit errors continued after that. It is up to the transmitter to decide whether and which fragments need to be retransmitted based on this information.

In case of bonded links, the incrementing by one can be supervised by the receiver only after the reordering process but this may provide a retransmission request delay in dependence of the link differential delay. This would be solvable if the retransmission sublayer transmitter stores the information which SID has been distributed to which link of the group and if the retransmission sublayer receiver transfers in case of errors the information about link number, current received SID and last valid received SID on the corresponding link before the error so that then the retransmission sublayer transmitter knows what it has to retransmit.

If the retransmission sublayer receiver gets a CRC errored fragment such as a CRC-16 errored fragment it can discard this fragment and knows that the link is not error-free anymore.

If the error is longer than three 65-byte TPS-TC structures so that all 3 structures are not valid the TPS-TC receiver may transfer to an out-of-synchronization (out-of-sync) state and will not forward any data via gamma interface until it is again in synchronization (sync state). So if more than three 65-byte structures are needed for a fragment it can occur that the sublayer above the TPS-TC receiver does not receive a CRC-16 errored fragment.

According to one embodiment, the retransmission sublayer receiver monitors the TPS-TC receiver regarding the synchronization state, i.e. supervision by control plane.

According to another embodiment, the receiver TPS-TC layer generates an OAM packet containing the information about a state transition from sync to out-of-sync which can be received by the retransmission sublayer receiver.

Retransmission Request Channel

In the following exemplary embodiments for a retransmission request channel (RRC) are described.

According to one embodiment, a dedicated latency path and bearer channel may be provided. This allows the use of an optimized transfer format. It can be defined such that a retransmission request consumes only a few bytes, e.g. 6 bytes. Then the retransmission request sublayer should transfer retransmission requests directly to the PMS-TC sublayer.

According to another embodiment, the existing TPS-TC OAM channel may be used for transmitting retransmission requests. If the OAM channel is used, the full line rate (a much higher bandwidth as 64 Kbit/s) can be reserved for the short time when the retransmission request is inserted.

The bonding OAM insertion buffers and bonding OAM extract filters/buffers can be reused from the bonding sublayer. It is to be noted that the PAF OAM function BACP is similar to a mechanism which is used in case of ATM bonding.

Reduction of the waiting time for the retransmission-request insertion due to current packet processing is to be considered. It may be possible that the insertion of a retransmission OAM packet with a retransmission request has to wait for a just started processing of an Ethernet packet with 1500 bytes. To reduce this delay, several techniques described below may be used.

According to a first technique, fragmentation and sequence numbering could be used for both line directions, also if this would be not required for non-bonded links with unidirectional retransmission, and the fragment size is configured to the smallest possible value.

According to a second technique, preemption is used with priority of retransmission OAM packets over other packets.

Furthermore, to keep the transfer time of a retransmission request small, the 64/65-octet TC sublayer operation mode "short packets" can be used which allows packets smaller than 64 bytes.

In some embodiments, noise detection may be implemented. The retransmission sublayer at the receiver site may detect the start of a noise impulse and may generate the retransmission request containing the last valid received sequence number (LastValidSN). The retransmission request may be generated and transferred repeatedly as long as no retransmission data has been received at the receiver.

According to one embodiment, the retransmission request channel may be provided by the additional retransmission header RTH described above with respect to the retransmission data unit. In this case, the additional retransmission header RTH contains information of the retransmission request such as the last valid received sequence number. Furthermore, rate decoupling may be used in the transmission direction of the retransmission request (upstream) to allow transfer of retransmission requests at any time independent whether user data is available for transmission or not.

According to one embodiment, fragmentation and sequence numbering is provided for both line directions also if this would not be required for non-bonded links with uni-directional transmission and the fragment sized is configured to a small size for example 64 bytes in order to avoid long waiting times for the retransmission request.

In the retransmission request channel, an extension RTHe (retransmission header extension) of for example one byte may be added to the fragment shown in FIG. 6b in order to allow the inclusion of the last valid received sequence number SN as shown in FIG. 6c when a retransmission request is transferred in the fragment. One bit of the retransmission header RTH may be used to indicate that the fragment contains the extension (i.e. that RTHe in FIG. 6c follows) and the bits of the RTH and RTHe may be used to contain the last valid received number LastValidSN which may for example include 14 bit.

Service Specific Retransmission

According to embodiments, the following services or classes of data may be distinguished to take a service specific retransmission into account.

A first class of data referred to as class A is related to delay sensitive services which need no retransmission such as VoIP, gaming application; service with low bandwidth; service should not be delayed by retransmission of other services.

A second class of data referred to as class B is related to high quality service such as IPTV. For theses services which are relaxed on delay retransmission is provided.

A third class of data which is referred to as class C is related to Best effort service such as WWW browsing, FTP download. These services are not critical on delay and may not necessarily require retransmission.

Exemplary Requirements for a service specific retransmission will be described below.

According to an embodiment, retransmission is applied only for the high quality service and not for the other services. On top of the retransmission protected service, i.e. net data rate minus high quality service rate, all available line bandwidth (data transmission rate) can be used for forced insertion of retransmission data. According to embodiments, neither class B, C service data nor retransmission data of the high quality service may delay the delay sensitive data of class A. In other words, Class A transmission is strictly prioritized over all other services and over retransmission.

Several embodiments can be implemented based on the above mentioned service specific retransmission.

According to an embodiment, two latency paths may be used with one bearer channel each. This would be the dual latency case since then one latency path (bearer channel) will be setup for high impulse noise protection and the other latency path (bearer channel) will be setup for delay sensitive data. But the delay sensitive service allocates always line bandwidth, also if this service is off.

Another embodiment which will be described in more detail with respect to FIGS. 4a and 4b includes the usage of one latency path with one bearer channel but 2 channels between the retransmission sublayer of the transmitter and the next higher sublayer and a strict priority multiplexer in the retransmission sublayer with delay sensitive service data from the next higher sublayer as first priority input, retransmission data from internal retransmission buffer as second priority input, other service data from the next higher sublayer as third priority input. In this case, no fixed line rate is allocated for the delay sensitive service and all available line bandwidth can be used for retransmission if the delay sensitive service is off.

Figure 4A:
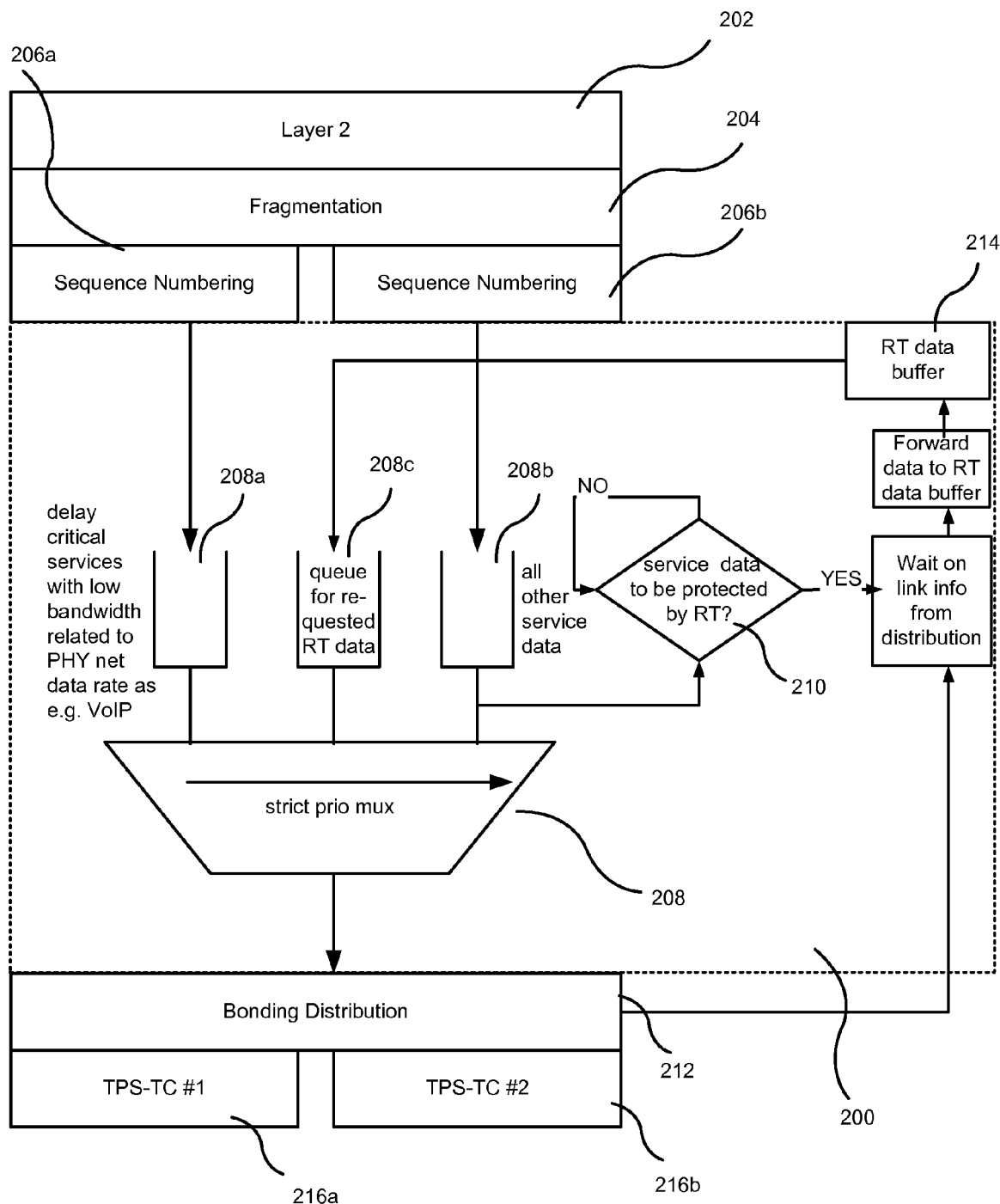
FIG. 4a shows a schematic embodiment of the present invention.

FIG. 4a shows now a first implementation of a queuing block or queuing entity 200 located above the bonding distribution sublayer.

As can be seen in FIG. 4a, a data link entity 202 is coupled to a fragmentation entity 204 provided to separate a data packet transferred from data link entity 202 into a plurality of fragments. A first identification entity 206a associated with a first channel related to class A services and a second identification entity 206b associated with a second channel related to class B services are coupled to the fragmentation entity 204. The first and second identification entities provide a sequence number for the plurality of data fragments transferred to each identification entity.

A priority multiplexer 208 comprises a first queue 208a for class A services coupled to the first identification entity and a second queue 208b for class B and class C services coupled to the second identification entity 206b.

Data from data fragments provided to the second queue are processed by a processor entity to determine whether a retransmission protection is needed for the data as indicated by reference number 210. If it is determined that the data is to be protected by retransmission, the data is transferred to a retransmission buffer 214 after receiving link information from a bonding distribution layer 212 to which the multiplexer 208 is coupled for distributing the received data fragments to communication links (subscriber lines) of the DSL system. The link information may for example include information whether impulse noise is currently present on one or both of the communication links.

The retransmission buffer 214 is coupled to a third queue 208c of the multiplexer 208 to retransmit the identified corrupt data fragments in case a retransmission is requested.

As indicated in FIG. 4a, the three queues 208a, b and c are strictly prioritized such that data in queue 208a is prioritized over data in queue 208c and data in queue 208c is prioritized over data in queue 208b.

The data fragments from the queues are multiplexed according to the above described priority scheme to the bonding entity 212. The bonding entity provides distributes the data among the bonded subscriber lines. Thus, data fragments intended to be transmitted over a first subscriber lines are transferred to a first TPS-TC entity 216a associated with the first subscriber line and data fragments transmitted over a second subscriber line are transferred to a second TPS-TC entity 216b associated with the second subscriber line.

While FIG. 4a shows only the TPS-TC layer, it is to be understood that for each of the subscribers lines layers and PMS-TC layer and PMD layers may be provided. It is to be noted that the basic data chunks for processing are the data fragments as provided from the fragmentation entity.

Figure 4B:
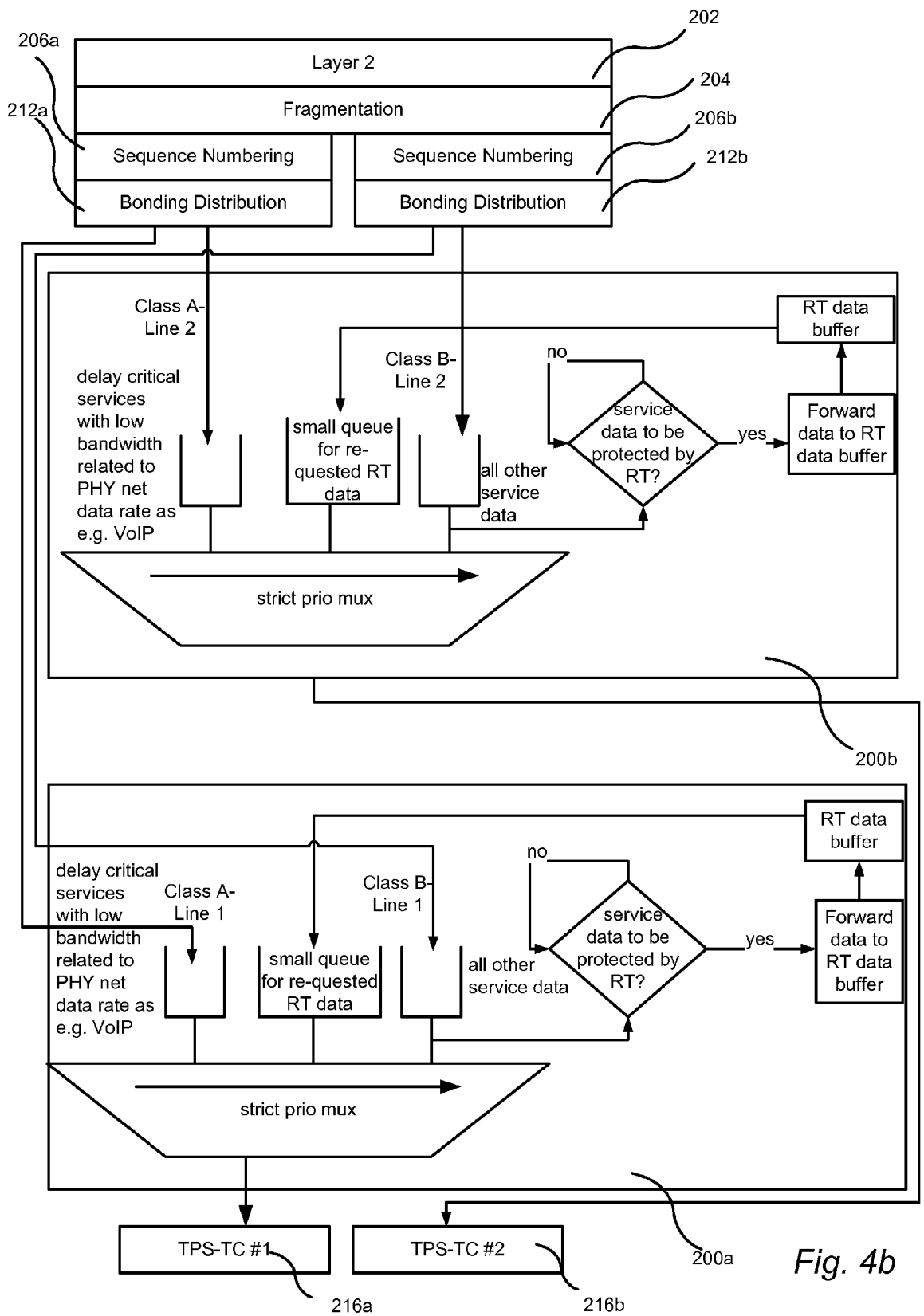
FIG. 4b shows a schematic embodiment of the present invention.

FIG. 4b shows a queuing if the queuing is located below the bonding distribution sublayer.

As shown in FIG. 4b, a first distribution entity 112a for distributing the priority class A data fragments to the subscriber lines and a second distribution entity 112b for distributing the other data fragments, i.e. the priority class B/C data fragments to the subscriber lines are coupled to the respective identification entities 206a and 206b.

For each subscriber line, a respective queuing entity 200a and 200b is provided similar to the queuing entity shown in FIG. 4a. However distinguished from FIG. 4a, since the queuing entity is provided for each subscriber line, transferring of line specific information is not required in the embodiment according to FIG. 4b. Each of the bonding distribution entities 206a and 206b has one output for distributing the respective data fragments in accordance with the priority scheme to the respective queues.

In the above, the queue 208b gets high quality service data as well as best effort service data so a differentiating factor is provided in an embodiment. A third channel between retransmission sublayer and the next higher sublayer may be implemented to provide separation of these data. This would require 3 interface addresses per DSL line if the next higher sublayer is located in a different device.

According to one embodiment, a dedicated bit in the packet/fragment may be used to indicate the service to be protected by retransmission. This info bit may be transferred also in the fragments because the far-end retransmission sublayer, i.e. the retransmission sublayer at the receiver sees only one data stream. This sublayer has to queue the retransmission protected service data while waiting on retransmission data und may not queue other service data. Today this information is already available in the VLAN tag of Ethernet packets. The fragmentation function could map this information via one special bit into the generated fragments.

For Class A service data, delay in the receiver due to a common reordering entity for all service data is avoided, in one embodiment. Two sequence numbering and reordering entities may be used then, one for class A service data and one for all other service data. For distinguishing between the two entities, one bit in the fragment header can be used.

According to one embodiment, the differentiating factor may be the VLAN tag prio field of Ethernet packets. In case of non-bonding application, the fragmentation is done by the retransmission sublayer transmitter and VLAN tag prio field evaluation can be done before fragmentation. In case of bonding application, the fragmentation is done by the bonding sublayer transmitter and the retransmission sublayer transmitter evaluates the start of packet flag in the fragment header since this fragment contains the VLAN tag prio field. This VLAN tag prio field information can be transferred to the far-end retransmission sublayer at the receiver via bits in RTH. The data stream classification can be done via different VLAN tag prio values. The relationship between VLAN tag prio and data stream class is communicated from the upper layers (data link or higher layers) to layer 1 (PHY layer) before user traffic is permitted.

Retransmission Data Insertion

In the following, embodiments of Retransmission Data insertion are described. In case of bonded links and if the bonding sequence number (SN) is used also for retransmission, the SN increments consecutively on bonding group level but not on link level. This is addressed in one embodiment if the retransmission sublayer transmitter stores the link specific transmission sequence order of SNs.

The transmitter gets from the far-end the information about the last valid received SN. It may stop then the sending of the by-retransmission-to-be-protected data stream for the time of configured impulse noise length INPMIN which may be correctable by retransmission. After this waiting time, it may retransmit the data units of the to-be protected data stream of this link which has been sent from LastValidSN+1 to the last sent SN when receiving the retransmission request. After insertion of retransmission data, the normal data stream can be continued.

For this retransmission principle, the retransmission sublayer transmitter should be aware of line data at any point of time. Therefore rate decoupling with "special idle fragments" as mentioned above may be done in the retransmission sublayer transmitter and the sequence numbering may be extended so that also the "special idle fragments" are included in the sequence numbering scheme. Identification of "special idle fragments" can be done via a bit in RTH. Extension of sequence numbering for "special idle fragments" can be done via bits in the idle fragment data. It can contain the 14-bit SN of the last user data fragment and an additional 14-bit SN which contains the information how many idle fragments has been sent between the last user data fragment and the current idle fragment.

Retransmission in the Layer Model

The following FIGS. 5a to 5d show two embodiments of arranging retransmission sublayer functions in a layer model.

Figure 5A:
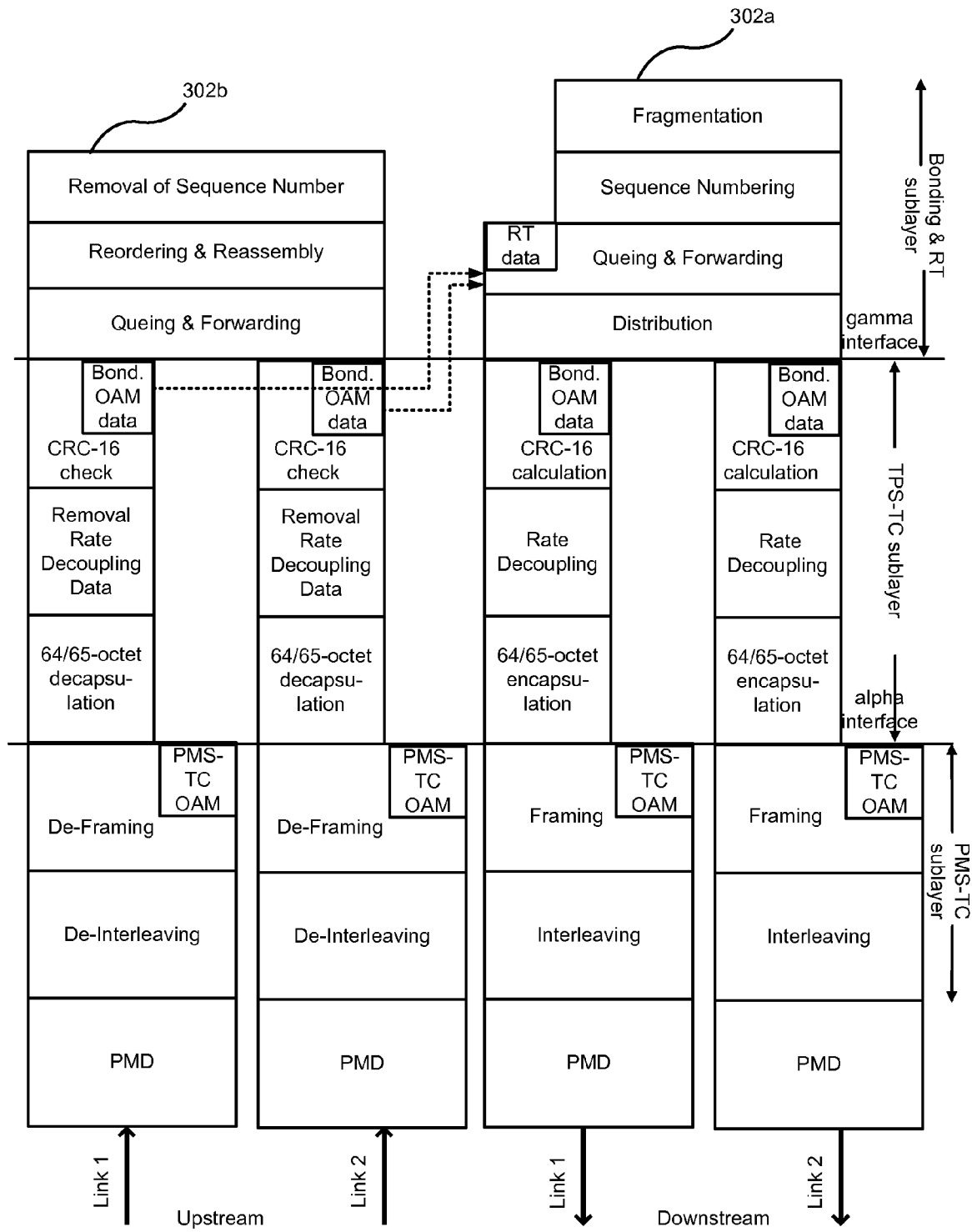
FIGS. 5a and 5b show a protocol stack according to an embodiment of the present invention.
Figure 5B:
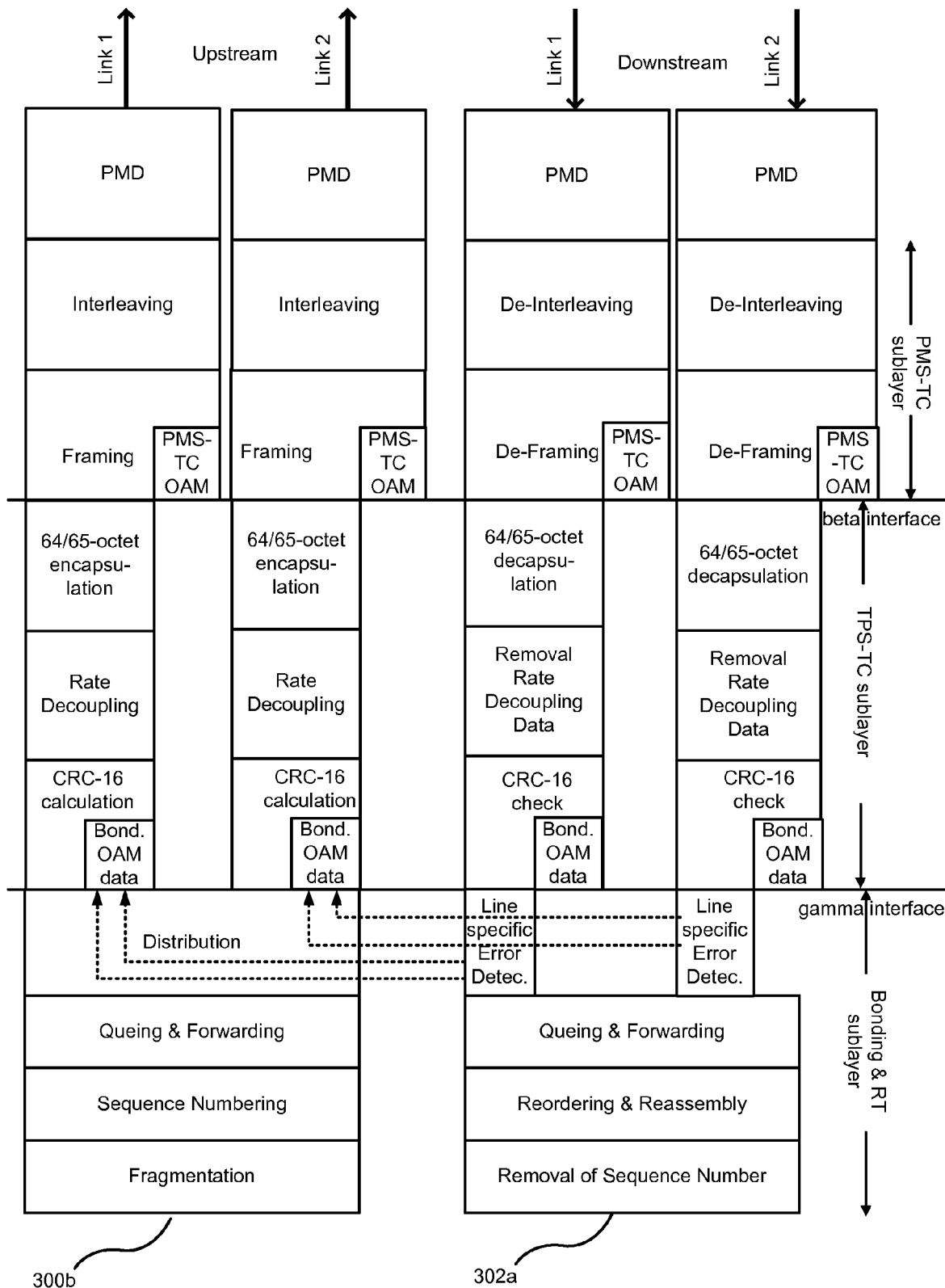

FIGS. 5a and 5b show an embodiment of a protocol stack for bonding with two links and retransmission for downstream data where queuing and forwarding of the retransmission sublayer transmitter with insertion of retransmission data is located above the distribution of the bonding sublayer transmitter. According to this embodiment, line specific error detection is provided in the retransmission sublayer of the receiver. Furthermore, bonding OAM insertion function is used also for retransmission request insertion and a line specific retransmission request is transported over all bonded links.

In more detail, FIG. 5a shows a protocol stack for a receiver and transmitter at the Central Office site while FIG. 5b shows the protocol stack at the subscriber site (remote site). The protocol stack 300a of the receiver at the Central Office site comprises a bonding and retransmission sublayer between the gamma interface and the data link layer (not shown). The bonding and retransmission sublayer comprises a fragmentation entity which may correspond to the fragmentation entity 204, an identification entity (sequence numbering) which may correspond to the identification entity 206, a queuing and forwarding entity and a distribution entity which may correspond to the bonding distribution entity 212. It is to be noted that the queuing and forwarding entity may correspond to the service dependent queuing entity 200 of FIG. 4a or may be a non-service dependent queuing entity.

In the TPS-TC sublayer, a CRC-16 entity with a bonding OAM entity for transmitting bonding information over an OAM channel is provided. Furthermore, the TPS-TC sublayer comprises a rate decoupling entity and a 64/65 octet encapsulation entity. The rate decoupling entity fills each TPS-TC encapsulation structure (in case of 64/65-octet TPS-TC it fills each 65-byte structure) with idle bits if data fragments are not fully occupied with user data. If a data fragment is fully occupied with idle bits, indication can be provided to the data fragment in order to avoid unnecessary retransmission of the non-useful data. The CRC-16 calculation entity provides CRC-16 calculation based on packet start and packet end identification provided in some of the data fragments. The 64/65 octet encapsulation entity provides 64/65 octet encapsulation as is known to a person skilled in the art.

In the PMS-TC sublayer, a framing entity, an interleaving entity is provided together with a PMS-TC layer OAM entity to provide OAM channel communication at PMS-TC level. Finally a PMD sublayer as explained with respect to FIG. 1 is provided.

As can be sheen in FIGS. 5a and 5b, each of the above described entities of the PMS-TC and TPS-TC sublayers are provided for each of the subscriber lines.

At the subscriber site, a protocol stack 302a having the reverse sequence of the protocol stack is provided in order to implement a receiver protocol stack. It is to be understood for a person skilled in the art that functionalities such as the interleaver framing and rate coupling are replaced at the receiver site by the complementary functionality.

Furthermore, it is to be understood that a transmitter protocol stack 300b similar to the protocol stack 300a may be implemented at the subscriber site. However, since the retransmission protection is only provided for downstream direction, no specific retransmission functionality is implemented at the protocol stack 300b.

As can be seen in FIG. 5b, a line specific error detection entity is provided at the receiver protocol stack 302a of the subscriber site to detect corrupt received data fragments. By using the identification provided by the identification entity at the Central Office site, the line specific error detection entity is capable of identifying the corrupt data fragments and transfers the identification information to the bonding OAM data entity of the transmitter protocol stack at the subscriber line. As can be seen in FIG. 5b, the information may be provided from the protocol stack for each of the subscriber lines to the OAM data entities of the transmitter protocol stacks for each subscriber line to allow transmitting of a retransmission request including the identification information over both subscriber lines back to the Central Office. This allows a more robust transmission of the retransmission request from the subscriber to the Central Office. At the Central Office, a receiver protocol stack 302b is implemented similar to the receiver protocol stack 302a. However, since in the described embodiment only downstream data, i.e. data transmitted from the Central Office to the subscriber, is retransmission protected, a line specific error detection is not implemented at the receiver protocol stack at the Central Office. At the Central Office, the retransmission request is processed by the bonding OAM entity. The bonding OAM entity transfers the identification information to the queuing and forwarding entity in the bonding and retransmission sublayer in order to start the retransmitting of the data fragments which are identified as corruptly received.

Figure 5C:
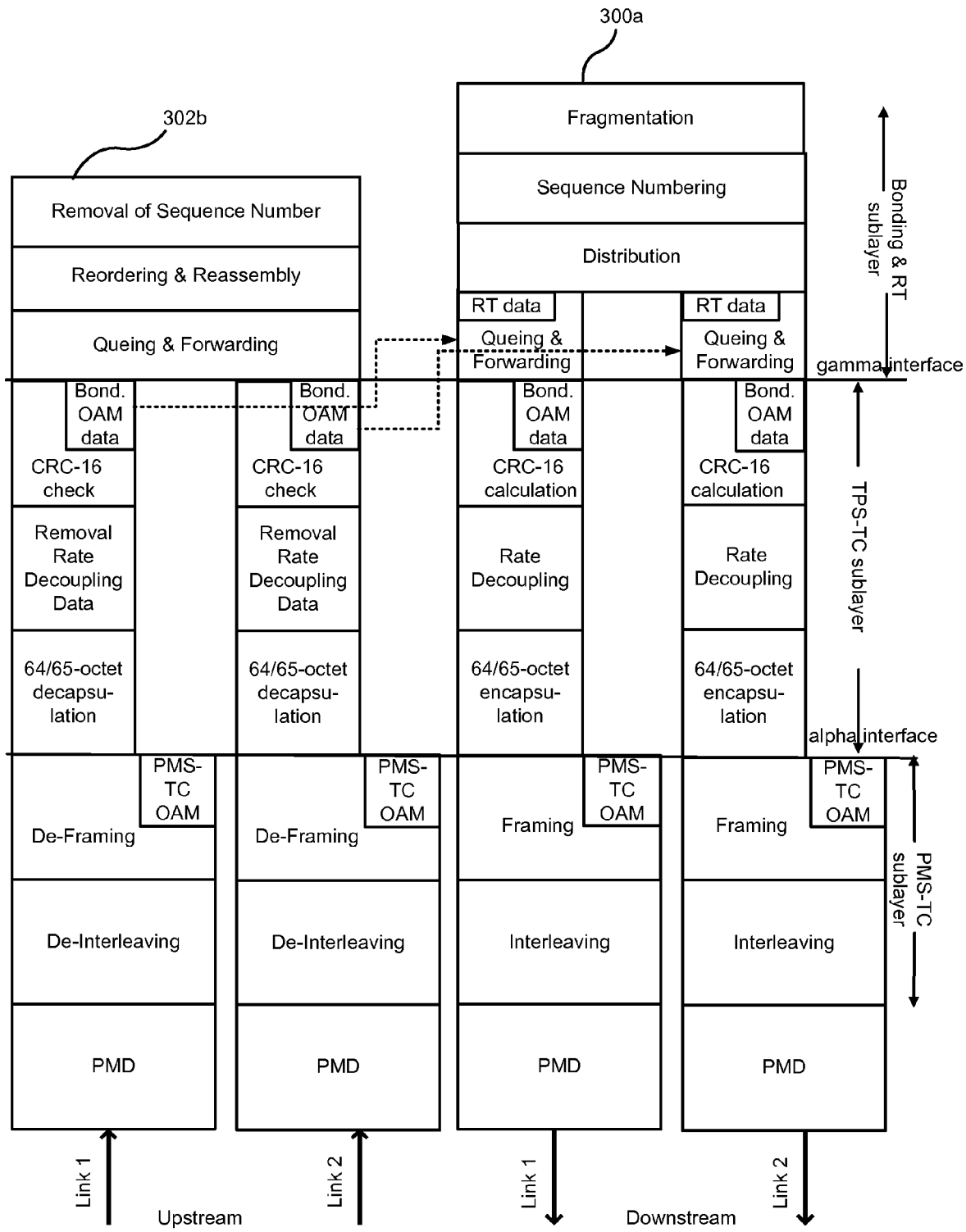
FIGS. 5c and 5d show a protocol stack according to an embodiment of the present invention.
Figure 5D:
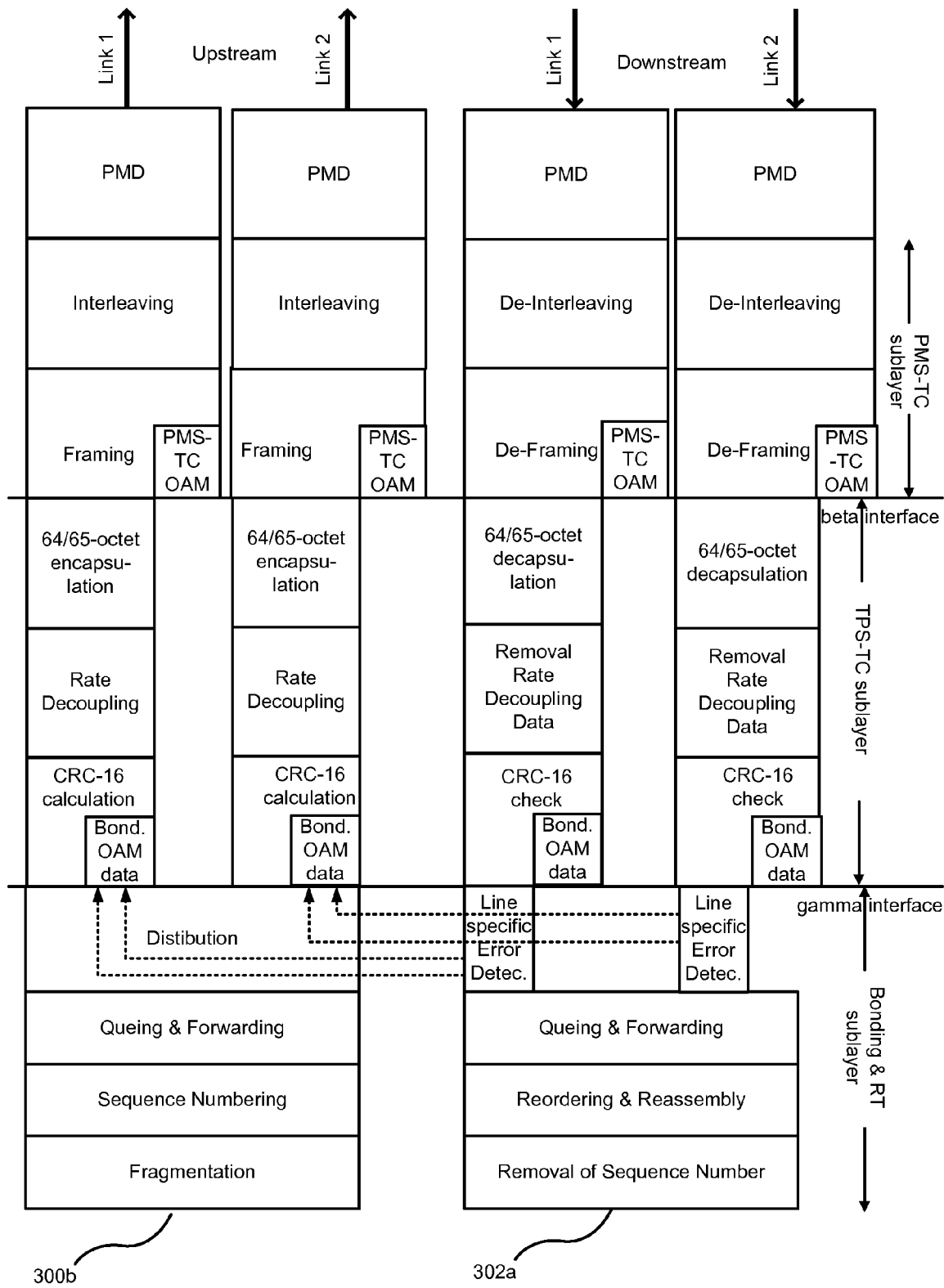

While FIGS. 5a and 5b show the queuing and forwarding functionality above the bonding distribution functionality, FIGS. 5c and 5d shows an embodiment for bonding with two links and retransmission for downstream data wherein the queuing and forwarding of the retransmission sublayer transmitter with insertion of retransmission data is located below the distribution of the bonding sublayer transmitter. FIG. 5c shows the protocol stack at the Central Office site and FIG. 5d shows the protocol stack at the subscriber site (remote site). In this embodiment, a line specific retransmission request is transported over the effected line in opposite direction, i.e. a pure link specific retransmission scheme is implemented. Distinguished from the embodiment of FIGS. 5a and 5b, the retransmission request is only retransmitted over one of the subscriber lines, i.e. the retransmission request is transmitted over the same subscriber line on which the respective data fragments have been transmitted.

It is further to be noticed that in the embodiment according to FIGS. 5c and 5d, since the queuing is implemented below the distribution, a queuing entity is provided for each of the respective subscriber lines similar to the provision of queuing entities for each subscriber line in the embodiment described with respect to FIG. 4b.

Figure 7A:
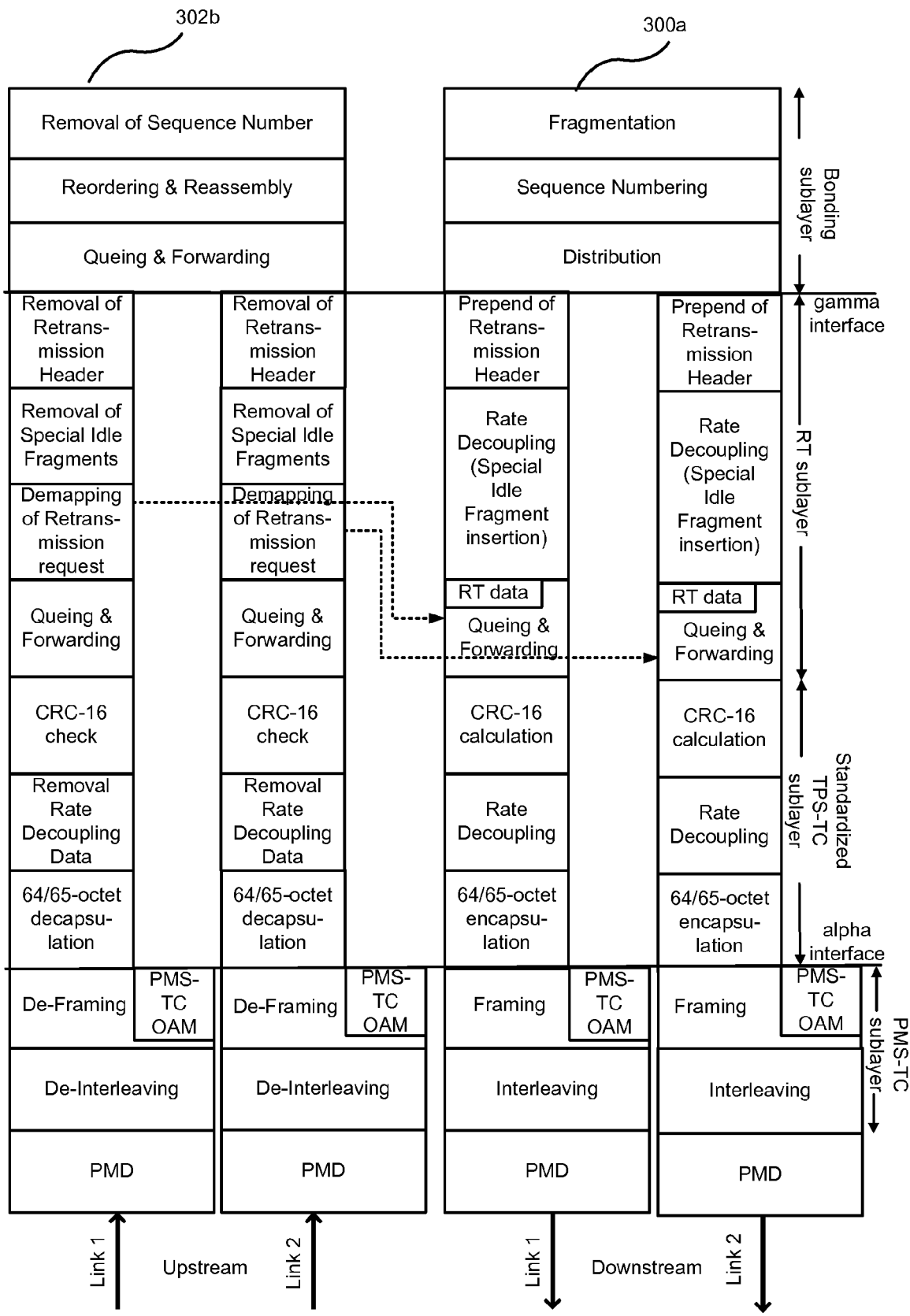
FIGS. 7a and 7b show a protocol stack according to a further embodiment of the present invention.
Figure 7B:
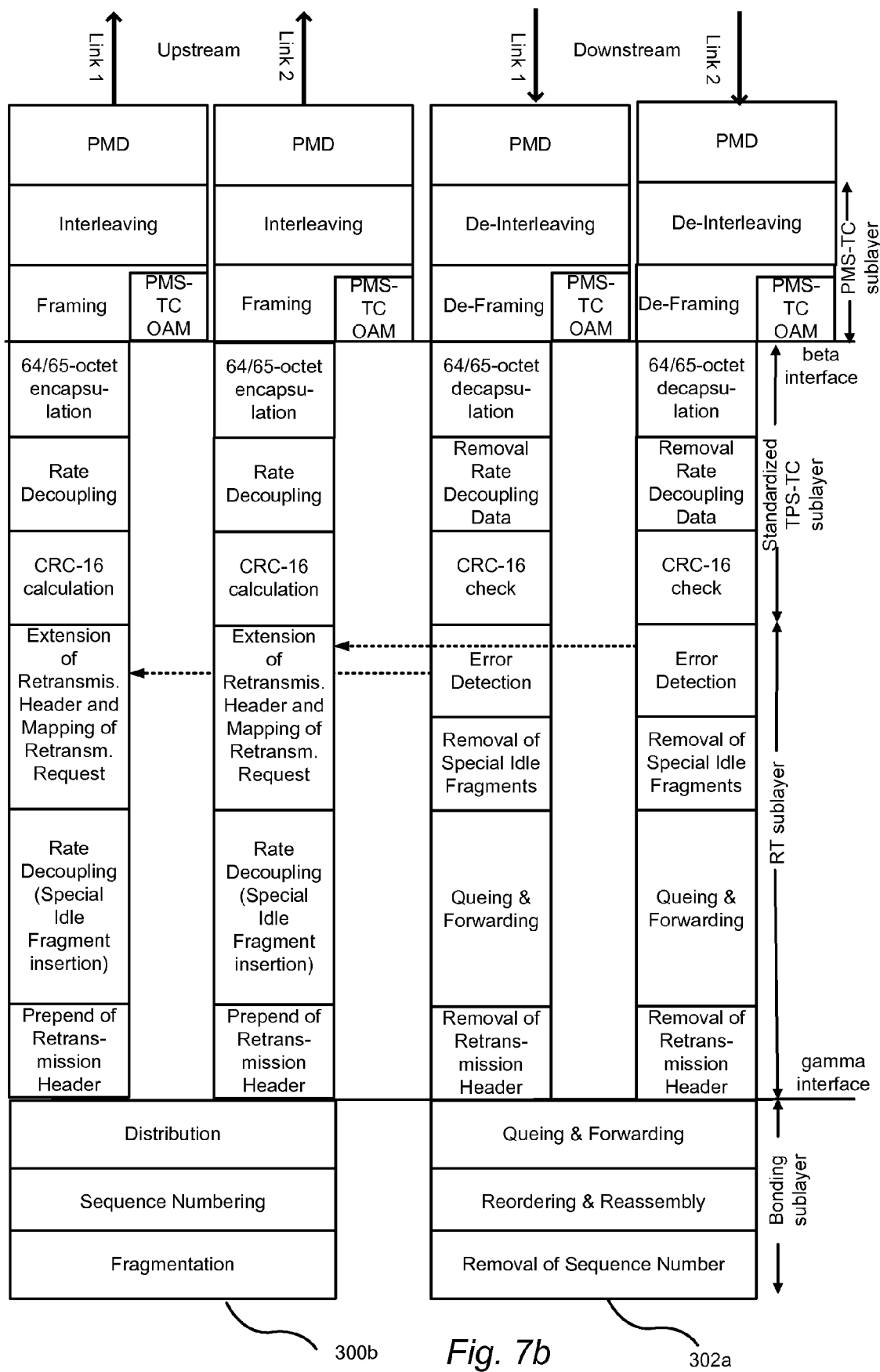

FIGS. 7a and 7b show a further embodiment of a protocol stack. In this embodiment, the bonding sublayer and the retransmission sublayer are separated. FIG. 7a shows the protocol stack at the Central Office site. FIG. 7b shows the protocol stack at the subscriber site (remote site).

A rate decoupling is provided in this embodiment for the implementation of the separate bonding sublayer and retransmission sublayer. Since the rate decoupling is provided below the bonding sublayer, the idle fragments are inserted/removed in a sublayer below the bonding sublayer. Therefore, the bonding sublayer is not capable of providing sequence information numbering for idle fragments. In order to allow sequence number identification also for idle fragments, the special category of idle fragments is provided which are hereinafter referred to as special idle fragments. These special idle fragments are inserted and removed in the retransmission layer provided between a bonding layer and the TPS-TC layer. The special idle fragments are not detected as idle fragments by the TPS-TC layer at the far-end receiver such that the retransmission sublayer at the far-end can receive these special idle fragments, identify them, evaluate the information contained therein, for example the sequence number identification of the idle fragment, and discard these special idle fragments in order to prohibit the further transfer of the special idle fragments to the bonding sublayer.

In case of bonded links and if the bonding sequence number SN is used also for retransmission, the SN increments consecutively on bonding group level but not on link level. Therefore, the retransmission sublayer at the transmitter site may store the link specific transmission sequence order of SNs.

The transmitter gets from the far-end the information about the last valid received SN. It may stop then the sending of the by-retransmission-to-be-protected data stream for the time of configured impulse noise length INPMIN which may be correctable by retransmission. After this waiting time, it may retransmit the data units of the to-be protected data stream of this link which has been sent from LastValidSN+1 to the last sent SN when receiving the retransmission request. After insertion of retransmission data, the normal data stream can be continued.

For this retransmission principle, the retransmission sublayer transmitter may be aware of line data at any point of time. Therefore rate decoupling with "special idle fragments" as mentioned above may be done in the retransmission sublayer transmitter and the sequence numbering may be extended so that also the "special idle fragments" are included in the sequence numbering scheme.

Identification of "special idle fragments" can be done via a bit in RTH. Extension of sequence numbering for "special idle fragments" can be done via bits in the idle fragment data. It can contain the 14-bit SN of the last user data fragment and an additional 14-bit SN which contains the information how many idle fragments has been sent between the last user data fragment and the current idle fragment.

According to one embodiment, the special idle fragments are used for training or determining one or more parameters of repetitive noise such as REIN (repetitive electrical impulse noise) parameters. The one or more parameters may then be used to determine time periods during which the repetitive noise is expected. During the determined time periods of the repetitive noise, no user data may be transmitted. According to one embodiment, instead of user data the special idle fragments are transmitted during the determined time periods.

To determine the parameters of repetitive noise, a plurality of special idle fragments are repeatedly transmitted from the transmitter to the receiver, wherein each of the special idle fragments comprising a sequence number. One or more sequence numbers of corrupted special idle fragments are identified at the receiver and one or more parameters of the repetitive noise based on the identified sequence numbers are determined. According to one embodiment, information related to a start and end of a repetitive impulse is transmitted from the receiver to the transmitter and the parameters of the repetitive noise are determined based on the transmitted information.

According to one embodiment, the retransmission sublayer at the transmitter site applies rate decoupling with special idle fragments and the sequence numbering is extended to these special idle fragments and the receiver informs the transmitter about the end of noise via first valid received sequence numbering. Then, the transmitter can detect in the first seconds after link startup whether repetitive noise exists or not. The user data stream will be enabled in the higher layers a bit later after link startup so that in the first seconds after link startup, there will be only special idle fragments on the line. In case of repetitive noise, the receiver will communicate a predetermined number of times, for example 100 times, a start of noise and end of noise message during the first second after link startup so that the transmitter can detect the periodicity and length of corrupted data. Due to this knowledge, the transmitter can from now on prevent that user data will be transmitted during the time of repetitive noise impulses via insertion of special idle fragments which don't need to be retransmitted. According to one embodiment, this user data prevention may be adapted dynamically during showtime, e.g. every 5 seconds.

With the above described determining of repetitive noise parameters and preventing of transmission during expected REIN periods, the retransmission scheme can be used for example when a combination of repetitive noise (repetitive noise impulses of up to 5 symbols every 10 ms) and non-repetitive noise such as noise impulses with long width (of up to 64 symbols) with a long time distance between the noise impulses occurs. The above embodiment of preventing transmission of user data by transmitting the special idle fragments allows an efficient retransmission with a predetermined retransmission waiting time (minimum number of symbols the transmitters waits until retransmitting the data) longer than a period of the repetitive noise.

As described above, according to embodiments, the following data streams can be differentiated:

1) Class B: High quality service; retransmission needed (IPTV; delay not very critical)
2) Class a: Delay Sensitive Service; No Retransmission needed (VoIP, gaming application; service with low bandwidth; service should not be delayed by retransmission of other services
3) Class C: best effort service; no retransmission needed (WWW browsing, FTP download; delay not critical).

Requirements for a data stream specific retransmission could be as follows:

i) Apply retransmission only for the high quality service and not for the other services
ii) All available line bandwidth on top of the retransmission protected service, i.e. net data rate minus high quality service rate, to be used for forced insertion of retransmission data,
iii) But retransmission data of the high quality service may not delay the delay sensitive data.

According to one embodiment, usage is made of one latency path with one bearer channel but 2 channels between the retransmission sublayer transmitter and the next higher sublayer and a strict priority multiplexer in the retransmission sublayer with delay sensitive service data from the next higher sublayer as first priority input, retransmission data from internal retransmission buffer as second priority input, other service data from the next higher sublayer as third priority input. No fixed line rate is allocated for the delay sensitive service and iii) can be fulfilled if the delay sensitive service is off. The third priority input gets high quality service data as well as best effort service data so a differentiating factor is needed.

The differentiating factor is the VLAN tag prio field of Ethernet packet. In case of non-bonding application, the fragmentation is done by the retransmission sublayer transmitter and VLAN tag prio field evaluation can be done before fragmentation. In case of bonding application, the fragmentation is done by the bonding sublayer transmitter and the retransmission sublayer transmitter has to evaluate the start of packet flag in the fragment header because this fragment contains the VLAN tag prio field.

This VLAN tag prio field information can be transferred to the far-end retransmission sublayer receiver via bits in RTH.

The data stream classification can be done via different VLAN tag prio values. The relationship between VLAN tag prio and data stream class may be communicated from the upper layers to layer 1 (PHY layer) before user traffic is permitted.

One embodiment of a layer model of the above described retransmission scheme with separated bonding and retransmission sublayer is shown in FIGS. 7a and 7b. As can be seen, the bonding layer provides fragmentation, sequence numbering and distribution functionality for the user data above the retransmission sublayer. The retransmission sublayer includes the prepending of the retransmission header wherein the RTH field as shown in FIG. 6b is added. Furthermore, rate decoupling is provided wherein the special idle fragments are inserted in the transmitter protocols stacks 300a and 300b or are removed in the receiver protocol stacks 302a and 302b. It is to be noted that at the protocol stack 302a of the receiver at the subscriber site, a removal of rate decoupling data (normal idle data) is provided in the TPS-TC layer. However, this functionality does not remove the special idle fragments which are transferred to the retransmission sublayer and are only removed after the CRC check and error detection and identifying of the sequence number of a corrupt idle fragment. After a corrupt fragment or a corrupt special idle fragment has been detected, the sequence number of the last valid fragment is mapped in the fragment header extended by the RTH and RTHe fields (compare for FIG. 6c) at the transmitter protocol stack 300b and transmitted to the receiver at the Central Office site. The protocol stack at the Central Office site demapps the sequence number in the fragment header and provides this information to the RT sublayer of the transmitter protocol stack 300a at the CO site to start retransmission. It is to be noted that retransmission may start after waiting a predetermined time period as described above.

While the above describes embodiments with a bonding sublayer, it is to be noted that in other embodiments the functionalities such as sequence numbering, fragmentation, and reassembly can be included in the retransmission sublayer without providing the bonding sublayer.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. It is further to be understood that the various methods disclosed in this specification and the claims can be implemented in devices having means or circuit components configured to enable the corresponding method steps.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. Furthermore the terms "coupled" or "connected" may be interpreted in a broad sense not only covering direct but also indirect coupling. Transmitter and receiver as used herein may in some embodiments be a transmitter or receiver device such as a modem and in other embodiments be only a single chip such as a baseband chip.

The accompanying drawings that form a part hereof show by way of illustration, and not of limitation, specific embodiments in which the subject matter may be practiced.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments include a combination of the dependent claim with the subject matter of each other dependent claim.

It is further to be noted that methods disclosed in the specification or in the claims may be implemented by a device having means for performing each of the respective steps of these methods.

What is claimed is:

1. A method comprising
   receiving a data packet;
   separating the data packet in a plurality of data fragments;
   providing for each of the plurality of data fragments or for a group of the plurality of data fragments an identification;
   transmitting the plurality of data fragments from a first transceiver unit to a second transceiver unit;
   providing information indicating whether a fragment of the plurality of fragments is to be protected by retransmission or providing information indicating whether a group of fragments is to be protected by retransmission;
   transmitting a request for retransmission from the second transceiver unit to the first transceiver unit, the request comprising one or more identifications;
   processing the request for retransmission at the first transceiver unit to identify one or more data fragments based on the one or more identifications; and
   retransmitting the one or more identified data fragments wherein the processing the request for retransmission at the first transceiver unit to identify one or more data fragments based on the one or more identifications and the retransmitting of the one or more identified data fragments is implemented between at least one sub-layer of a TPS-TC layer and a data link layer.

2. The method according to claim 1, further comprising processing each data fragment to provide 64/65 octet encapsulation.

3. The method according to claim 1, wherein the separating of the data packet and the providing of an identification is provided by a processing between a 64/65 octet encapsulation sublayer and a data link layer.

4. The method according to claim 1, further comprising:
   distributing the data fragments to a plurality of subscriber lines based on the identification.

5. The method according to any of claim 1, further comprising dynamically changing the length of the data fragments.

6. The method according to claim 1, further comprising:
   multiplexing a first data stream associated with a first service type, a second data stream associated with a second service type and a third data stream associated with retransmission data.

7. The method according to claim 1, further comprising providing a rate decoupling functionality by transmitting idle fragments which are transparent to a TPS-TC layer of the first transceiver and the second transceiver or at least all TPS-TC sublayers hierarchically below the rate decoupling functionality.

8. The method according to claim 1, further comprising determining one or more repetitive noise parameters, the one or more repetitive noise parameters determining time periods during which no user data is transmitted.

9. The method according to claim 1, further comprising:
   transmitting from the second transceiver to the first transceiver a request for retransmission, the request for retransmission including the identification of the last correctly received data fragment or the identification of the last correctly received group of data fragments.

10. A transmitter comprising:
    a fragmentation entity to separate a packet into a plurality of data fragments;
    a processor entity to provide information indicating whether a fragment of the plurality of data fragments is to be protected by retransmission or providing information indicating whether a group of data fragments is to be protected by retransmission;
    an identification entity to provide for each data fragment or group of data fragments an identification; and
    a TPS-TC entity to receive data fragments with the identification and provide TPS-TC processing
    a retransmission entity to receive a retransmission request including at least one of the identifications of the data fragments from a remote transceiver unit, wherein the retransmission entity is implemented between at least one sublayer of a TPS-TC layer and a data link layer, wherein the retransmission entity is configured to transfer to the TPS-TC entity one or more data fragments based on the at least one identification received from the remote transceiver unit.

11. The transmitter according to claim 10, further comprising a bonding entity for bonding a plurality of subscriber lines wherein the bonding entity is configured to distribute the data fragments to the plurality of subscriber lines.

12. The transmitter according to claim 10, further comprising a rate decoupling entity, wherein the rate decoupling entity is configured to include idle fragments which are transparent to a TPS-TC layer or at least all TPS-TC sub-layers hierarchically below the rate decoupling entity.

13. The transmitter according to claim 10, further comprising a multiplexer, the multiplexer configured to multiplex a first data stream of data fragments associated with a first service type, a second data stream of data fragments associated with a second service type and a third data stream of data fragments associated with retransmission data.

14. A receiver comprising
a retransmission entity to receive data fragments, wherein each of the data fragments or a group of data fragments comprises an identification, wherein the retransmission entity is configured to provide indication of at least one corrupt fragment, wherein the retransmission entity is implemented between at least one sublayer of a TPS-TC layer and a data link layer, wherein the retransmission entity is configured to receive the data fragments from a TPS-TC entity, the TPS-TC entity implementing at least one functionality of a TPS-TC sublayer for the received data fragments;
a processor entity to provide information indicating whether a fragment of data fragments is to be protected by retransmission or providing information indicating whether a group of data fragments is to be protected by retransmission; and
a request generation entity to receive the indication and to generate a retransmission request based on the identification and the indication of at least one corrupt data fragment or at least one corrupt group of data fragments.

15. The receiver according to claim 14, wherein the retransmission entity is configured to receive the data fragments from a TPS-TC entity, the TPS-TC entity implementing at least one functionality of a TPS-TC sublayer for the received data fragments.

16. The receiver according to claim 14, further comprising a CRC entity, the CRC entity providing an error detection based on a packet start identifier provided in at least a first fragment of the data fragments and a packet end identifier provided in at least a second fragment of the plurality of fragments.

17. The receiver according to claim 14 wherein the receiver comprises a bonding entity, the bonding entity sharing at least one functionality with the retransmission entity.

18. A DSL transmission system comprising:
a first transceiver unit, the first transceiver unit comprising
a fragmentation entity to separate a packet into a plurality of data fragments;
a first identification entity to provide for each data fragment or a group of data fragments an identification;
a processor entity to provide information indicating whether a fragment of the plurality of data fragments is to be protected by retransmission or providing information indicating whether a group of data fragments is to be protected by retransmission;
a first transmission entity to transmit the plurality of data fragments; and
a first retransmission entity to receive retransmission requests and to identify at least one fragment based on the received retransmission request,
wherein the first retransmission entity is implemented between at least one sublayer of a TPS-TC layer and a data link layer of the first transceiver unit;
a second transceiver unit, the second transceiver unit comprising
a second retransmission entity to receive the plurality of data fragments and to provide indication of at least one corrupt data fragment, wherein the second retransmission entity is implemented between at least one sublayer of a TPS-TC layer and a data link layer of the second transceiver unit;
a request generation entity to receive the indication and to generate a retransmission request based on the indication and the identification; and
a second transmission entity to transmit the retransmission request to the first transceiver unit.

19. The system according to claim 18, wherein the first transceiver unit further comprises a CRC entity to provide a packet start identifier in at least a first one of the data fragments and a packet end identifier in at least a second one of the data fragments and wherein the second transceiver further comprises a CRC entity to provide error detection based on the packet start and packet end identifier.

20. The system according to claim 18, wherein the first retransmission entity is configured to transmit the data fragments to a first TPS-TC entity, the first TPS-TC entity implementing at least one functionality of a TPS-TC sublayer, and
wherein the second retransmission entity is configured to receive the data fragments from a second TPS-TC entity, the second TPS-TC entity implementing at least one functionality of a TPS-TC sublayer.

21. The system according to claim 18, wherein the first transceiver comprises a rate decoupling entity, wherein the rate decoupling entity is configured to include idle bytes in at least one of the TPS-TC encapsulation structures.

22. A transmission apparatus having implemented a protocol stack for a DSL transmission system, the protocol stack comprising a retransmission functionality, the retransmission functionality being provided between a sublayer of a TPS-TC layer and a data link layer, the retransmission functionality having a fragment of a packet or a group of fragments of a packet as basic retransmission unit, wherein the protocol stack is implementing a service specific retransmission functionality such that for a first class of services retransmission protection is provided and for a second class of services no retransmission protection is implemented, and wherein the retransmission functionality is configured to transfer one or more data fragments based on at least one identification received from remote transceiver unit.

* * * * *